March 4, 1952  H. L. FRICK  2,587,832

SLAVE CYLINDER ASSEMBLY

Original Filed Feb. 1, 1946

INVENTOR
HAROLD L. FRICK
BY
ATTORNEY

Patented Mar. 4, 1952

2,587,832

UNITED STATES PATENT OFFICE 2,587,832

SLAVE CYLINDER ASSEMBLY

Harold L. Frick, Detroit, Mich., assignor to Hydraulic Brake Company, a corporation of California Substituted for abandoned application Serial No. 644,731, February 1, 1946. This application May 10, 1950, Serial No. 161,202

8 Claims. (Cl. 188—79.5)

This application is a substitute for my abandoned application Serial Number 644,731, filed February 1, 1946.

This invention relates to brakes and more particularly to means for adjusting the friction elements thereof.

The invention comprehends simple and efficient means for automatically adjusting the friction elements of a conventional brake proportionately to the wear of the lining on the friction element, so that when the brake is at rest the friction elements may be supported in proper spaced relation to the drum.

An object of the invention is to provide an automatically operative adjuster for the friction element of a brake controlled by wear of the lining on the friction element.

Another object of the invention is to provide an automatically operative adjuster for the friction element of a conventional brake which may be easily and quickly installed and will efficiently perform its intended function.

Another object of the invention is to provide an automatically operative adjuster for the friction element of a conventional brake which may be manufactured as an accessory at low cost and easily installed in several different types of braking systems now in general use.

Yet another object of the invention is to provide an automatically operative adjuster for the friction elements of a brake of the fluid pressure actuated type wherein adjusters may be sleeved on the thrust pins connecting the actuating means with the friction elements.

Figure 1:
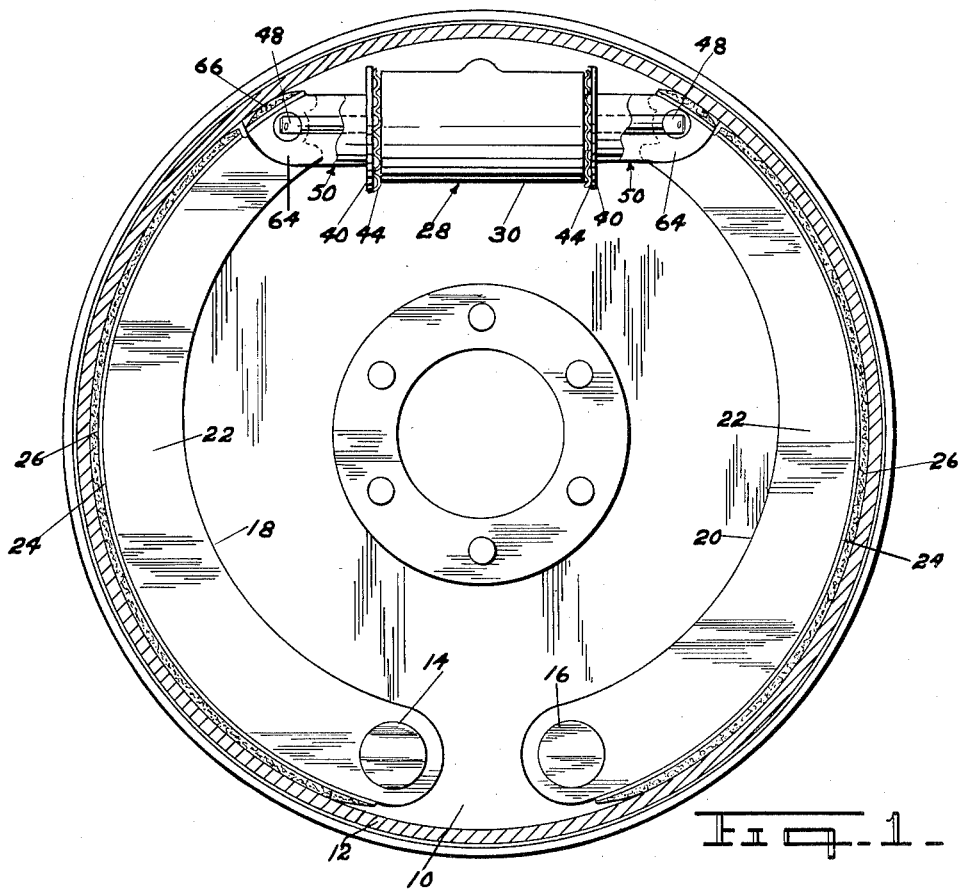
Figure 2:
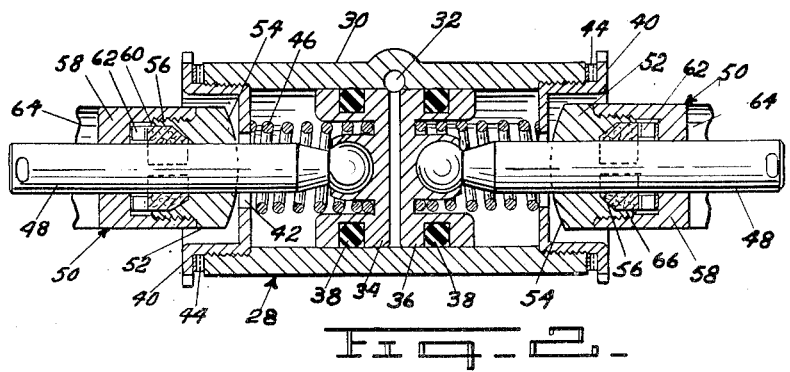

Other objects and advantages of the invention will appear from the following description when taken in connection with the drawings forming a part of this specification, and in which:

Fig. 1 is a vertical sectional view of a brake illustrating the invention as applied; and Fig. 2 is a longitudinal sectional view of the fluid pressure actuated motor and the adjusters.

Referring to the drawings for more specific details of the invention, 10 represents a fixed support or backing plate adapted to be secured to an axle or to an axle housing, and a rotatable drum 12 associated with the backing plate is adapted to be secured to a wheel.

The backing plate has thereon spaced anchors 14 and 16 and a pair of corresponding, interchangeable friction elements or shoes 18 and 20 have their articulate ends pivoted on the anchors. Each of the shoes includes a web 22 supporting a rim 24 having suitably secured thereon a friction lining 26 for cooperation with the drum.

A fluid pressure actuated motor indicated generally at 28 is secured to the backing plate 10 between the force applying ends of the friction elements or shoes. The motor includes a cylinder 30 having a port 32 centrally disposed with relation to the length thereof, and corresponding oppositely disposed pistons 34 and 36 are mounted for reciprocation in the cylinder.

Each of the pistons 34 and 36 carries a sealing ring 38 for inhibiting seepage of fluid from the cylinder past the piston. A cap 40 having a concentrically disposed opening 42 is threaded in each end of the cylinder and held against displacement as by a lock washer 44, and retractile springs 46 are interposed between the pistons and the caps.

Thrust pins 48 suitably connect the pistons 34 and 36 to the force applying ends of the friction elements or shoes 18 and 20, and automatically operative adjusting means for the friction elements indicated generally at 50 are carried on each of the thrust pins. Each of the automatically operative adjusters 50 includes a heavy washer 52 sleeved on the thrust pins. The washer has an arcuate end 54 seated on the cap 40 and a conical recess 56 in its other end. A cap 58 is threaded on the washer and friction elements embracing the thrust pin are seated in the conical recess and urged into pressing engagement with the pin by a spring 62 interposed between the friction elements and the cap.

The caps 58 have spaced arms 64 adapted to straddle the shoes 18 and 20 at the force applying ends thereof and blocks 66 on the arms cooperate with the drum.

Under normal operating conditions upon energization of the fluid pressure actuated motor 28, the pistons 34 and 36 thereof are moved in opposite directions and during this movement of the pistons force is transmitted from the pistons through the thrust pins 48 to the force applying ends of the friction elements 18 and 20, resulting in movement of the friction elements into engagement with the drum against the resistance of the retractile springs 46, to effectively retard rotation of the drum. This operation inherently results in wear of the linings 26 on the friction elements and this causes maladjustment of the brake.

On the incident invention, the lining 26 on the friction elements and the blocks 66 of the adjusters 50 engage the drum concomitantly. The linings 26 are subjected to the usual wear incident to such an operation and the blocks 66 of the adjusters because of their low coefficient of friction resist wear. Accordingly there is a relative movement between the friction elements and the adjusters 50, and this results in movement of the adjusters on the thrust pin to a slightly retracted position where they are held by the friction members 56 urged into gripping engagement with the thrust pins by the springs 62.

Under this condition, upon completion of a breaking operation and release of applied pressure on the fluid in the motors 28, the pistons 34 and 36 return to their respective retracted positions under the influence of the retractile springs 46 carrying with them the thrust pins 48 and the friction elements 18 and 20, and when returned to fully retracted position the washers 52 of the adjusters seat on the heads of the cylinder 40 and serve to support the friction elements in proper spaced relation to the drum.

Although this invention has been described in connection with certain specific embodiments, the principles involved are susceptible of numerous other applications that will readily occur to persons skilled in the art. The invention is, therefore, to be limited only as indicated by the appended claims.

Having thus described the various features of the invention, what I claim as new and desire to secure by Letters Patent is:

1. A brake comprising a movable member, a friction element associated therewith, a thrust member for moving the friction element into engagement with the movable member, a fixed member, and a stop member coacting with the fixed member and frictionally engaging the movable member and frictionally gripped on the thrust member and movable thereon as the result of a differential in wear between the friction element and that part of the stop member engaging the movable member.

2. A brake comprising a movable member, a friction element associated therewith, a thrust member for moving the friction element into engagement with the movable member, a fixed member, a stop frictionally clamped to the thrust member coacting with the fixed member and having a part adapted to engage the movable member simultaneously with the friction element and movable on the thrust member proportionally to a differential in wear between the friction element and the part.

3. A brake comprising a movable member, a friction element for cooperation therewith, a thrust pin for moving the friction element into engagement with the movable member and means for determining the retracted position of the thrust pin including a stop member frictionally clamped to the thrust pin and having a wear resisting part adapted to engage the movable member simultaneously with the frictional element and movable on the thrust pin proportionately to a differential in wear between the friction element and the wear resistance part.

4. A brake comprising a rotatable drum, a friction element for cooperation therewith, a fluid pressure actuated motor, a thrust pin connecting the motor to the friction element and automatically operative means for adjusting the friction element with relation to the drum, including a stop member frictionally clamped to the thrust pin having a wear resisting part adapted to engage the drum concomitantly with the friction element and movable on the thrust pin proportionally to a differential in wear between the frictional element and the wear resistance part.

5. A brake comprising a rotatable drum, a friction element for cooperation therewith, a fluid pressure actuated motor, a thrust pin connecting the motor to the friction element, means in the motor for returning the friction element to retracted position, and means for automatically adjusting the friction element to compensate for wear thereof including a stop member frictionally clamped to the thrust pin and normally seated on the motor, said stop member having a wear resistance part adapted to engage the drum simultaneously with the friction element and being movable on the thrust pin proportionately to a differential in wear between the friction element and the wear resistance part.

6. A brake comprising a rotatable drum, a friction element for cooperation therewith, a motor having a piston movable therein and a closure cap therefor, a thrust pin connecting the piston to the friction element, a retractile spring between the piston and cap, a stop frictionally clamped on the thrust pin having a wear resisting part adapted to engage the drum simultaneously with the friction element and movable on the pin proportionately to the differential in wear between the friction element and the wear resistance part.

7. A brake comprising a rotatable drum, a friction element for cooperation therewith, a fluid pressure actuated motor having a piston movable therein, and a closure cap provided with an opening, a thrust pin movable through the opening having its ends respectively secured to the piston and to the friction element, a spring interposed between the piston and the cap, a stop frictionally clamped on the thrust pin having a wear resistance part adapted to engage the drum simultaneously with the friction element, said stop movable on the thrust pin as a result of a differential in wear between the friction element and the wear resistance part and to seat on the cap when the brake is at rest.

8. A brake comprising a rotatable drum, corresponding oppositely disposed friction elements for cooperation therewith, a fluid pressure actuated motor between the elements including a cylinder having therein oppositely disposed movable pistons and a closure cap on each end of the cylinder, thrust pins securing the pistons to the friction elements, retractile springs sleeved on the thrust pins between the pistons and caps, stops for cooperation with the caps frictionally clamped on the thrust pins and having parts adapted to engage the drum simultaneously with the friction elements, said stops being movable on the pins proportionately to the differential in wear between the friction elements and the wear resistance parts.

HAROLD L. FRICK.

REFERENCES CITED

The following references are of record in the file of this patent:

UNITED STATES PATENTS

| Number | Name | Date |
|---|---|---|
| 2,175,446 | Rasmussen | Oct. 10, 1939 |
| 2,242,685 | Swift | May 20, 1941 |
| 2,497,815 | Frick | Feb. 14, 1950 |